Nov. 3, 1925.  1,559,875
C. J. HOLSLAG
ELECTRODE FOR ARC WELDING
Filed Dec. 13, 1919
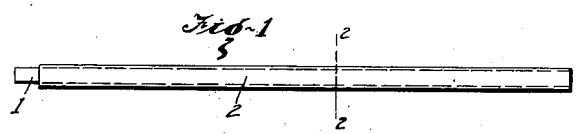
 
 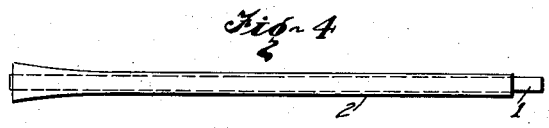
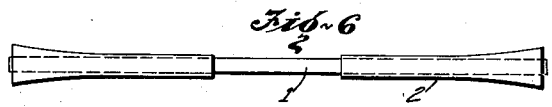
Covering
Preferably silicate of soda with or without carbon and
with or without carbonate of calcium, or pulverized asbestos,
may also add boron or magnesium and finely divided metal
INVENTOR
Claude J. Holslag
BY
Albion D.T. Libby
ATTORNEY Patented Nov. 3, 1925.

1,559,875

UNITED STATES PATENT OFFICE.

CLAUDE J. HOLSLAG, OF SOUTH ORANGE, NEW JERSEY, ASSIGNOR TO ELECTRIC ARC CUTTING & WELDING COMPANY, OF NEWARK, NEW JERSEY.

ELECTRODE FOR ARC WELDING.

Application filed December 13, 1919. Serial No. 344,646.

*To all whom it may concern:*

Be it known that I, CLAUDE J. HOLSLAG, a citizen of the United States, residing at South Orange, in the county of Essex, State of New Jersey, have invented certain new and useful Improvements in Electrodes for Arc Welding, of which the following is a description, reference being had to the accompanying drawing and to the figures of reference marked thereon.

This invention relates to a method of general welding and particularly welding thin metal as well as cast iron and carbo-steel either alone or with other elements by means of an electric arc in which means are provided in or on one of the electrodes for carrying out the method of operation. My invention is adapted for use with both direct or alternating current but I prefer to use the same in connection with one of my alternating current welding transformers, such as described in my Patents No. 1,305,361 or 1,305,363, issued June 3, 1919.

In my application, Serial No. 258,197, filed October 15, 1918, now Patent 1,528,878 issued March 10, 1925 I have shown and described a metal electrode suitable for general welding purposes and having a coating containing a considerable amount of silica, preferably in the form of silicate of soda, together with or without other substances; but such an electrode, usually $\frac{1}{8}''$ or $\frac{5}{32}''$ in diameter, requires in the neighborhood of 100 amperes or more in the welding arc which is altogether too hot for thin metal, such as 16, 18 and 20 gauge steel. In order to weld metal of this thinness the current must be cut down, likewise the size of the electrodes and then without the use of my invention the arc will melt the thin metal so rapidly as to "break through" to such an extent as to make welding of this kind very difficult, if not impossible.

It is known that in metallic arc welding where a thick coating is used around the electrode the arc voltage is considerably higher than when using a bare electrode or an electrode covered with a flux covering instead of a thick slag covering. Due to this higher voltage across the arc it is easier to start the arc with an electrode having a thick coating, but as pointed out in my above mentioned application, Serial No. 258,197, a thick slag coating is objectionable on account of the slag getting into the melted metal constituting the weld, etc. In order, however, to obtain the advantages of the higher voltages for starting the weld and to obtain the advantages of a thin coating after the arc is started, I have discovered that by thickening the coating just at the end where the arc is started and then reducing the thickness of the coating to the point where the electrode is held by the welding handle, I can obtain all advantages flowing from both arrangements.

It is, therefore, the principal object of my invention to provide an electrode and a method of operating the same which will enable me to do general welding as well as to weld thin metal, carbo-steel and cast iron in a more expeditious manner than heretofore.

By way of illustrating my invention, I have shown in the annexed drawing in Figures 1, 2 and 3 views of an electrode similar to Figures 1, 2 and 3 in my application, Patent No. 1,528,878 above referred to, in which Figure 1 shows an electrode partially covered with a thin coating of material.

Figure 2 is a section along the line 2—2 of Figure 1, while

Figure 3 is a similar section but with the electrode covered all the way around.

Figure 4 shows an electrode which has the covering enlarged in thickness at one end and the other end being adapted to be engaged by a welding handle.

Figure 5 is an end view of Figure 4.

Figure 6 shows an electrode which is adapted to be grasped in the center by the welding handle and the coating is increased in thickness at both ends.

In order to accomplish the object of my invention, when used for welding thin work, cast iron and carbo-steel, I take for example, a small metal electrode 1, say $\frac{1}{16}''$ in diameter and apply to it a coating 2 in a similar manner to that shown and described in my application previously referred to but the coating in this case is composed of ingredients which act to lower the melting point of the electrode so that the electrode can be maintained steadily melting ahead of the thin work which constitutes the opposite electrode without any backing or cooling members behind the work.

The coating preferably consists of silicate of soda and lamp black, the silicate of soda serving to quiet the arc and refine the melted material besides acting as a binder or vehicle for the other ingredients. In some cases, I may use with the two ingredients mentioned, calcium carbonate and pulverized asbestos as well as a small quantity of magnesium or boron or other substances which have a great affinity for oxygen and nitrogen so that most of the carbon can combine with the iron. The asbestos, when present, is simply used as a physical diluent in order that the substance may have mass enough to form a solid coating on the rod. Calcium carbonate acts to lower the melting point at which the arc will hold hence allowing a lower temperature and less chance of the carbon or other desirable elements from being lost. From the above it will be seen that carbon can be mixed with the resultant welding material for any degree of hardness and an electrode having carbon to a considerable extent in its coating is especially useful in welding high carbon tool steel or in adding carbon to a cast iron weld making the weld nearer the content of the original cast iron.

By using a carbon coated electrode as above set forth, I have lowered the temperature at which the electrode melts so that in welding cast iron the same is not subjected to a high temperature which is apt to crack or leave internal stresses in the cast iron, and I have found that a low temperature and little heat, such as produced by the electrode described herein, is highly advantageous in welding cast iron. Since the electrodes used are smaller than those used heretofore the welding may be done with the cast iron cold, that is to say, without any preheating which is the usual method of welding cast iron at present.

With one of my alternating current transformers as described in the patents previously referred to and an electrode covered with a carbon coating as herein described, I have been able to hold an arc with an 18 U. S. gauge electrode with a current as low as 4½ amperes which so far as I am aware is way below anything heretofore accomplished.

By my method, it is possible to include the deposition of the line of carbo-steels such as carbo-manganese, carbo-tungsten, etc. It is impossible to deposit carbo-steels or cast iron except by protecting the carbon from the oxygen as the carbon disappears by a burning action in the arc taking some of the iron with it, in fact over .6 carbon substantially burns up a small bare electrode leaving no metal. With my combination of carbon externally protected by other agents such as magnesium or boron, the carbon will be deposited in the steel after the highest temperatures have been passed and hence remain therein.

It will be apparent to one skilled in the art that my invention may be approached in some degree by the use of an electrode having a high content of carbon; for example, I have done good welding on thin steel by using an electrode having a carbon content of .5 or .6 whereas the ordinary steel welding electrode contains approximately .2 carbon, and I may, therefore, use the carbon in or on the electrode as described, but rather than order specially drawn material containing a relatively high percentage of carbon, I prefer to take the standard material and apply the carbon as a coating in the manner described. I do not wish to limit myself to any definite amount of ingredients used in the coating on my electrode except that the amount of carbon used should be sufficient to make the electrode melt ahead of the work when the same is used for welding thin material. In certain cases the silica or its preferred form, silicate of soda, may be the principal ingredient as disclosed in my application 258,197 filed October 10, 1918, now Patent 1,528,878 issued March 10, 1925, and which has been herein referred to.

It will be understood that in welding thin metal, carbo-steel and cast iron that the electrode may be used as shown in Figures 1, 4 or 6, furthermore it is to be understood that for general welding purposes when the carbon is not required I use a covering the same as that described in my Patent 1,528,878 issued March 10, 1925, but to gain the advantages of easy starting, as heretofore pointed out, I increase the thickness of the coating at the starting end as indicated in Figures 4 and 6.

In the form of electrode shown in Fig. 1, the electrode has a part of its periphery substantially along its entire length left bare for the purpose of ease in striking and locating the arc, all as set forth in the application just referred to wherein this partially coated electrode is broadly claimed.

Having thus described my invention, what I claim is:—

1. An electrode for welding and repairing comprising a metal rod having a coating consisting of a silicate and carbon in the form of lamp black.

2. An electrode for electric arc welding and repairing of thin sheet steel and cast iron comprising a metal rod having a coating consisting only of silica, preferably in the form of silicate of soda, carbon and carbonate of calcium.

3. An electrode for electric arc welding and repairing of thin sheet steel and cast iron comprising a metal rod having a coating consisting of silica, preferably in the form of silicate of soda, carbon, carbonate of calcium and asbestos preferably in a pulverized state.

4. An electrode for electric arc welding and repairing of thin sheet steel and cast iron, comprising a metal rod having a coating consisting of silica, preferably in the form of silicate of soda, carbon and magnesium.

5. An electrode for welding and repairing comprising a metal rod having a coating consisting of a mixture of silicate of soda and lamp black.

6. An electrode for electric arc welding and repairing of thin sheet steel and cast iron, comprising a metal rod having a coating consisting of silica preferably in the form of silicate of soda, carbonate of calcium, carbon and a second material having a great affinity for oxygen and nitrogen.

7. An electrode for electric arc welding and repairing of thin sheet steel and cast iron, comprising a metal rod having a coating consisting of silica preferably in the form of silicate of soda, asbestos, carbon and a second material having a great affinity for oxygen and nitrogen.

8. An electrode for electric arc welding and repairing of thin sheet steel and cast iron comprising a metal rod having a coating consisting of silica preferably in the form of silicate of soda, carbonate of calcium, carbon and a second material having a great affinity for oxygen and nitrogen.

9. An electrode for welding and repairing comprising a metal rod, having a coating consisting only of a silicate and carbon in an amorphous form.

10. In electrode for electric arc welding and repairing of thin sheet steel and cast iron comprising a metal rod having a coating consisting principally of silica preferably in the form of silicate of soda and carbon.

11. An electrode for electric arc welding and repairing of thin sheet steel and cast iron, comprising a metal rod having a coating consisting principally of silica, preferably in the form of silicate of soda and carbon and including also magnesium.

12. An electrode for electric arc welding and repairing of thin sheet steel and cast iron, comprising a metal rod having a coating consisting principally of silica, preferably in the form of silicate of soda and carbon and including also carbonate of calcium.

13. An electrode for electric arc welding and repairing of thin sheet steel and cast iron comprising a metal rod having a coating consisting principally of silica, preferably in the form of silicate of soda and carbon and including also asbestos preferably in a finely divided state.

14. An electrode for electric welding, cutting, reducing or the like, at least one end of which is provided with a coating tapered away from the end.

15. An electrode for electric arc welding, cutting, reducing or the like provided with a coating throughout its length, at least one end of which is tapered away from the end.

16. An electrode for electric arc welding, cutting, reducing or the like which is provided with a coating partially encompassing the electrode, at least one end of which is tapered away from the ends.

17. An electrode for electric arc welding, cutting, reducing or the like which is provided with a coating partially encompassing the electrode and extending throughout the whole length thereof, at least one end of which is tapered away from the end.

18. An electrode for electric arc welding having a uniform homogeneous outer coating consisting of a mixture of carbon and a silicate binder.

19. A welding and repairing electrode comprising a fusible rod, having a coating consisting only of an oxygen containing compound of silicon and carbon in a finely divided form.

20. A welding and repairing electrode comprising a fusible rod having a coating including an oxygen containing compound of silicon and carbon in the form of lamp black.

In testimony whereof, I affix my signature.

CLAUDE J. HOLSLAG.